United States Patent [19]

Cormaci

[11] Patent Number: 5,342,639
[45] Date of Patent: Aug. 30, 1994

[54] MAKING DRY COFFEE AROMA GAS WITH IMPROVED AROMA CHARACTERISTICS

[75] Inventor: Alice M. Cormaci, Cincinnati, Ohio

[73] Assignee: The Procter & Gamble Company, Cincinnati, Ohio

[21] Appl. No.: 154,902

[22] Filed: Nov. 18, 1993

[51] Int. Cl.$^5$ ................................. A23F 5/46
[52] U.S. Cl. ..................... 426/386; 426/417; 426/594
[58] Field of Search .................. 426/594, 417, 386

[56] References Cited

U.S. PATENT DOCUMENTS

| | | | |
|---|---|---|---|
| 3,783,163 | 1/1974 | Patel | 426/221 |
| 3,821,447 | 6/1974 | Jasovsky et al. | 426/386 |
| 3,979,528 | 9/1976 | Mahlmann | 426/594 |
| 4,007,291 | 2/1977 | Siedlecki et al. | 426/594 |
| 4,119,736 | 10/1978 | Howland et al. | 426/386 |
| 4,335,149 | 6/1982 | Stipp | 426/386 |
| 4,551,345 | 11/1985 | Davidescu et al. | 426/594 |
| 4,556,575 | 12/1985 | Katz et al. | 426/594 |
| 4,574,089 | 3/1986 | Musto et al. | 426/386 |
| 4,900,575 | 2/1990 | Cale et al. | 426/387 |
| 5,008,125 | 4/1991 | Cale et al. | 426/387 |

OTHER PUBLICATIONS

Perry, Chemical Engineers' Handbook, 3rd Ed., 1950, McGraw-Hill Book Co., Inc.: New York, pp. 880–881.

*Primary Examiner*—Joseph Golian
*Attorney, Agent, or Firm*—William J. Winter

[57] ABSTRACT

Disclosed is a method for making dry coffee aroma gas with improved aroma characteristics. A stream of moisture-containing coffee aroma gas is passed through and allowed to exit a desiccant bed of calcium sulfate granules, wherein said granules initially contain less than about 0.5% adsorbed moisture by dry weight of said granules. The stream of moisture-containing coffee aroma gas is discontinued after the adsorbed moisture content of the calcium sulfate granules increases from less than about 0.5% to at least about 4.3% by dry weight of said granules, but before the moisture content of the stream of desiccant-treated coffee aroma gas exiting the desiccant bed exceeds about 1000 ppm. All of the desiccant-treated coffee aroma gas which exits the desiccant bed is collected and combined until the stream of moisture-containing coffee aroma gas is discontinued. The desiccant-treated coffee aroma gas contains between about 10 and about 200 ppm of moisture and does not exhibit an unbalanced and excessively musty aroma. The desiccant-treated coffee aroma gas can be used to aromatize food substrates, e.g., instant coffee.

12 Claims, 1 Drawing Sheet

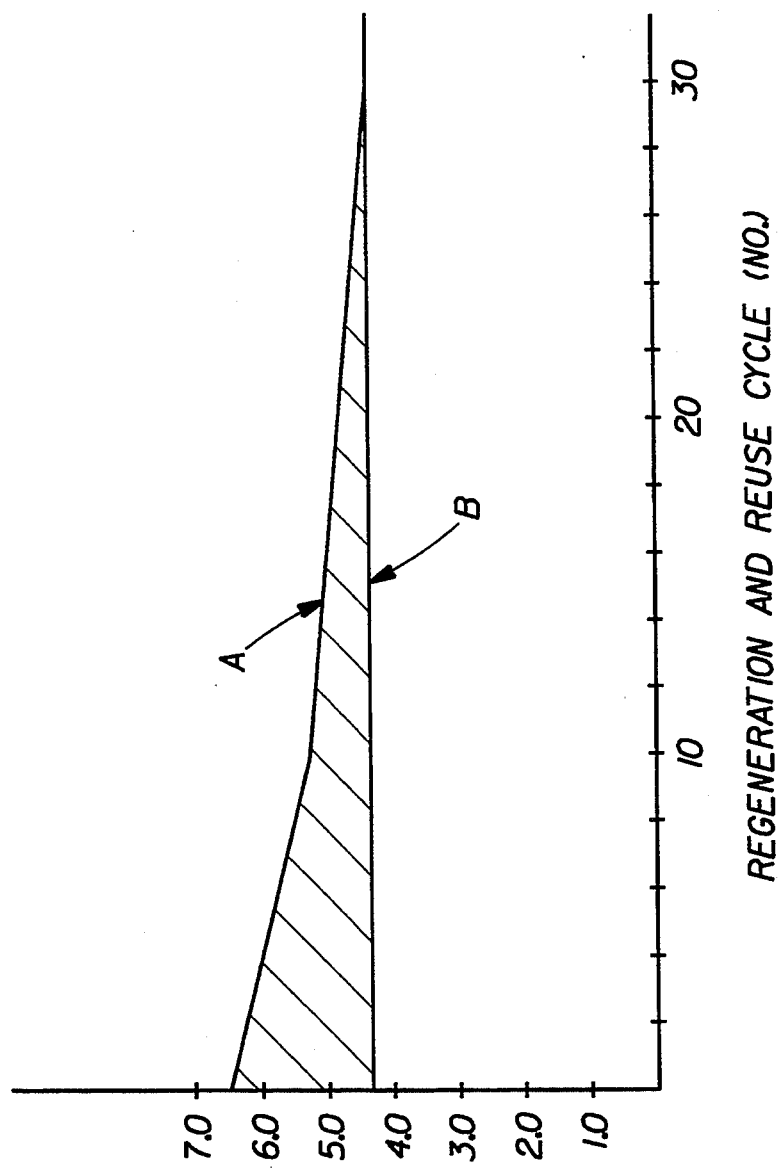

MAKING DRY COFFEE AROMA GAS WITH IMPROVED AROMA CHARACTERISTICS

TECHNICAL FIELD

The present invention relates to a process for making dry coffee aroma gas, e.g., coffee grinder gas, with improved aroma characteristics. The dry coffee aroma gas can be used to aromatize food substrates, e.g., instant coffee.

BACKGROUND OF THE INVENTION

Coffee aroma gas is commonly used to enhance the aroma of various coffee products. To accomplish this, the coffee aroma gas is incorporated into a liquid carrier such as coffee oil and then used to aromatize the various coffee products.

For example, U.S. Pat. No. 4,335,149 to Stipp (assigned to The Procter & Gamble Company) issued Jun. 15, 1982, discloses a method for the direct condensation of coffee aroma gas onto a fluidized bed of cryofied coffee oil particles. A bed of particulated solid coffee oil is placed in a vessel cooled by a cryogenic fluid. The particulated solids are fluidized to provide an adsorbent bed thereof. Gaseous aroma volatiles from a coffee aroma gas are then condensed onto the cooled and fluidized bed of particles having a temperature of below $-150°$ F. The aromatized particles thus formed can be equilibrated, melted and then added to instant coffee to provide aroma. Stipp teaches that it is usually desirable to remove any moisture from the coffee aroma gas prior to condensation to remove undesirable heat loads and to minimize plugging of the fluidized bed of cryofied coffee oil particles. Although Stipp does not disclose a method for doing so, it was well known that water-cooled condensers could be used to remove some of the aroma gas moisture, typically up to about 50% of the aroma gas moisture.

An improved method for removing moisture from coffee aroma pas was described in U.S. patent application, Ser. No. 07/902,747, filed Jun. 23, 1992, and now abandoned. In the method described therein, moisture is removed directly from coffee aroma gas by passing it through a bed of hydratable calcium sulfate granules. The resulting desiccated gas is then condensed and combined with an aroma carrier, e.g., coffee oil, equilibrated and melted. The melted product is an aromatized coffee oil that can be added to instant coffee to provide aroma. Removing moisture directly from the coffee aroma gas helps minimize the generation of excessive sulfurous aromas in the aromatized coffee oil. In the presence of water, aromatized coffee oils can rapidly develop excessive sulfurous aromas.

It has been found, however, that the desiccant-treated coffee aroma gas made according to the Patent Application disclosure often exhibits an unbalanced and excessively musty aroma. Aromatized coffee oil containing this desiccant-treated coffee aroma gas likewise often exhibits an unbalanced and excessively musty aroma.

It is therefor an object of the present invention to provide a process for removing moisture from coffee aroma gas using a calcium sulfate desiccant, which process does not cause the development of unbalanced and excessively musty aromas in the desiccant-treated coffee aroma gas.

These and other objects of this invention will become evident from the disclosure herein.

SUMMARY OF THE INVENTION

The present invention provides a process for making dry coffee aroma gas with improved aroma characteristics. In accordance with this process, a stream of moisture-containing coffee aroma gas is passed through and allowed to exit a desiccant bed of calcium sulfate granules, wherein said granules initially contain less than about 0.5% adsorbed moisture by weight (dry basis) of the calcium sulfate granules. The stream of moisture-containing coffee aroma gas is discontinued after the adsorbed moisture content of the calcium sulfate granules increases from less than about 0.5% to at least about 4.3% by weight (dry basis) of the calcium sulfate granules, but before the moisture content of the stream of desiccant-treated coffee aroma gas exiting the desiccant bed exceeds about 1000 ppm. All of the desiccant-treated coffee aroma gas which exits the desiccant bed is collected and combined until the stream of moisture-containing coffee aroma gas is discontinued. The collected and combined desiccant-treated coffee aroma gas contains between about 10 and about 200 ppm of moisture and does not exhibit an unbalanced and excessively musty aroma. This desiccant-treated coffee aroma gas can be used to aromatize food substrates.

The improvements over the prior art, which are incorporated into the process herein, are 1) the critical moisture parameters at which the calcium sulfate drying process must operate, and 2) the combining of all desiccant-treated coffee aroma gases exiting the desiccant bed while operating up to and within these critical moisture parameters. It was found that moisture-containing coffee aroma gas dried via a calcium sulfate desiccant frequently exhibits an unbalanced and excessively musty aroma. The present invention provides a process for avoiding the development of these unbalanced and excessive aromas.

BRIEF DESCRIPTION OF THE DRAWINGS

FIG. 1 is a graph which shows the critical moisture parameters in the drying process of the present invention. The vertical axis represents adsorbed moisture levels in the calcium sulfate desiccant. The horizontal axis represents the number of previous regeneration and reuse cycles for the desiccant bed.

In FIG. 1, Line A represents the adsorption capacity of the desiccant bed of calcium sulfate granules for any given regeneration and reuse cycle. Exceeding this adsorption capacity will result in undesirable moisture breakthrough in the desiccant-treated coffee aroma gas. Excessive amounts of moisture in the desiccant-treated coffee aroma gas can result in the rapid development of excessive sulfurous aromas.

In FIG. 1, Line B represents the minimum adsorbed moisture level (in a desiccant bed of calcium sulfate granules) for any given regeneration and reuse cycle. Failure to run the drying process herein beyond this minimum level will result in unbalanced and excessively musty aromas in the desiccant-treated coffee aroma gas.

Cross-hatched area CDE represents the range of adsorbed moisture levels in the desiccant bed for any regeneration and reuse cycle in which the drying process herein must operate in order to avoid the excessive generation of sulfurous or musty aromas.

DEFINITIONS

The terms used herein have the following meanings.

"Adsorbed moisture" refers to moisture from a moisture-containing coffee aroma gas which is adsorbed by a desiccant bed of calcium sulfate granules. "Adsorbed moisture" is expressed as percent adsorbed moisture by weight (dry basis) of calcium sulfate granules in the desiccant bed.

"Moisture-containing coffee aroma gas" is coffee aroma gas which has not passed through a calcium sulfate desiccant, and which contains more than about 0.10% moisture.

"Regenerated calcium sulfate granules" are calcium sulfate granules which have been subjected to any known or conventional drying process to remove adsorbed moisture. These "regenerated" granules contain less than about 0.5% adsorbed moisture.

"Regeneration and reuse cycle" refers to the sequence in which a desiccant bed of calcium sulfate granules is utilized in the drying process herein and then subsequently air dried to remove adsorbed moisture.

"Dry", "desiccated" or "desiccant-treated" coffee aroma gas means coffee aroma gas which has passed through a calcium sulfate desiccant and contains between about 10 and about 200 ppm of moisture.

All percentages, parts, and ratios are based on weight unless otherwise specified.

DETAILED DESCRIPTION OF THE INVENTION

The process of the present invention involves a drying operation by which moisture is removed from coffee aroma gas using a calcium sulfate desiccant. The desiccant-treated coffee aroma gas exhibits balanced aroma without excessively musty aroma characteristics. In a preferred process, the desiccant-treated coffee aroma gas is combined with an aroma carrier to form an aromatized coffee oil.

These processes are described in detail as follows.

Moisture Removal Using a Calcium Sulfate Desiccant

In the process of the present invention, moisture-containing coffee aroma gas is passed through and allowed to exit a desiccant bed of calcium sulfate granules. All of the exiting gas is collected and combined to form a desiccant-treated coffee aroma gas containing between about 10 and about 200 ppm of moisture. A more detailed description of the process is as follows.

1. Coffee Aroma Gas

Coffee aroma gas for use in the drying process herein can be provided by known and conventional means. Coffee aroma gas comprises coffee volatiles captured during coffee manufacturing operations such as roasting, grinding, steam distillation, or dry distillation. Preferably, the coffee aroma gas is obtained during the grinding of roasted coffee beans (coffee grinder gas). Coffee grinder gas can be readily obtained by enclosing or hooding grinding equipment during grinding operations. Grinder gases liberated from the ground coffee may be removed by a pump, rotary blower, or the like. If pumping is employed, it may be desirable to cool the gas ahead of the pump so that the heat added by pumping will not degrade the aroma volatiles contained in the gas.

When coffee beans are roasted and ground, they release a coffee grinder gas which comprises carbon dioxide, water and aroma volatiles. When mixed with air during capture, coffee grinder gas typically comprises 4–8% carbon dioxide, 0.8–2.5% moisture and 0.10–0.20% aroma volatiles. As used herein, "aroma volatiles" are those compounds that are released from roasted coffee which collectively provide a typical roasted coffee aroma.

2. Drying Coffee Aroma Gas Using a Calcium Sulfate Desiccant

In the drying process herein, moisture is removed from a stream of moisture-containing coffee aroma gas by passing it through a desiccant bed of calcium sulfate granules. The moisture content of the gas stream will typically be between about 1000 and about 8000 ppm upon entering the desiccant bed, and between about 10 and about 200 ppm upon exiting.

Prior to contacting the stream of moisture-containing coffee aroma gas, the calcium sulfate granules initially contain less than about 0.5% adsorbed moisture by weight (dry basis) of the granules. This adsorbed moisture level increases as the stream of moisture-containing coffee aroma gas is passed through the desiccant bed thus removing moisture from the gas stream. A stream of moisture-containing aroma gas is passed through the desiccant bed until the adsorbed moisture level in the desiccant bed increases from less than about 0.5% to at least about 4.3% by weight (dry basis) of the calcium sulfate granules. Thereafter, passage of the gas stream can be continued only until the moisture content of the exiting gas stream suddenly increases from about 10 to 50 ppm to between about 200 and about 1000 ppm. At that point, the drying operation is complete and the stream of moisture-containing coffee aroma gas must be discontinued.

The graph set forth in FIG. 1 helps to illustrate the range of adsorbed moisture levels (in the desiccant bed) in which the drying process must operate. The cross-hatched area CDE on the graph represents the critical range of adsorbed moisture levels in the desiccant bed which must be reached but not exceeded during the drying process. As described hereinafter, all of the desiccant-treated aroma gas is combined and collected. This includes the aroma gas fractions exiting the desiccant bed when adsorbed moisture levels are below 4.3% (FIG. 1, line B) and the aroma gas fractions exiting the desiccant bed when adsorbed moisture levels are between about 4.3% (FIG. 1, line B) and the adsorption capacity (FIG. 1, line A).

The flow rate of the moisture-containing coffee aroma gas will typically be between about 5 and about 20 scfm (std. cu. ft. per min.) per 100 lb. calcium sulfate granules, more typically about 15 scfm per 100 lb. of calcium sulfate granules (in a desiccant vessel described hereinafter). High flow rates will tend to decrease the moisture adsorption capacity slightly for any given regeneration and reuse cycle.

It is important that all of the desiccant-treated coffee aroma gas be collected and combined. This includes all of the desiccant-treated coffee aroma gas fractions exiting the desiccant bed from the beginning to the end of the drying process described hereinabove. Each desiccant-treated aroma gas fraction has a unique aroma characteristic. It is only when these aroma gas fractions are collected and combined do they collectively exhibit a typical, balanced, roasted coffee aroma. The combination of desiccant-treated coffee aroma gas collected during the drying process contains between about 10 and about 200 ppm, preferably between about 10 and about 50 ppm of moisture.

It is known that calcium sulfate desiccants have a moisture adsorption capacity of about 6.5%. When used specifically to dry moisture-containing coffee aroma gas, it was found that this adsorption capacity will decrease with each regeneration and reuse cycle (described hereinafter) of the calcium sulfate granules (see FIG. 1). For any given cycle, the point at which this adsorption capacity is reached correlates with the point at which the moisture content of the exiting desiccant-treated aroma gas stream rapidly increases from between about 10 and about 50 ppm, to between about 200 and 1000 ppm. This rapid increase represents moisture breakthrough as the moisture adsorption capacity is reached or exceeded.

The adsorbed moisture levels in the desiccant bed at any given moment can be calculated using the equation $M_{ads}=[(D \times V \times H_s \times 100)/W]+M_p$ where $M_{ads}$ is the percent adsorbed moisture by weight (dry basis) of the calcium sulfate granules at any given moment; D is the density (lb./scf) of moisture-containing coffee aroma gas; V is the volume (scf) of moisture-containing coffee aroma gas passed into the desiccant bed; $H_s$ is the saturation humidity (lb. moisture/lb. dry air) in the moisture-containing coffee aroma gas just prior to passing into the desiccant bed; W is the weight (lb.) of calcium sulfate in the desiccant bed; and $M_p$ is the percent moisture by weight (dry basis) of the calcium sulfate granules prior to initiating the gas drying process herein. $M_p$ will always be less than 0.5%, typically less than 0.1%. The density (D) of moisture-containing coffee aroma gas is approximately 0.81 to 0.83 lb./scf. Other methods for measuring adsorbed moisture levels, including more direct measurements of such levels, can be used in the drying process herein.

It is important that the drying process continue until the adsorbed moisture level in the desiccant bed increases to at least about 4.3% by weight (dry basis) of the calcium sulfate granules. It was found that stopping the drying process before reaching this minimum adsorbed moisture level normally results in desiccant-treated coffee aroma gas with an unbalanced and excessively musty aroma. It is believed that this excessively musty aroma is due to a deficiency of certain unknown aroma volatiles bound to the calcium sulfate granules. As adsorbed moisture levels reach about 4.3% by weight (dry basis) of the calcium sulfate desiccant, it is believed that the adsorbed moisture begins to displace these certain aroma volatiles into the exiting desiccant-treated gas stream thus eliminating the unbalanced and excessively musty aroma.

It is believed that moisture adsorption and displacement of bound coffee aroma volatiles is the key to the drying process herein. It is believed that coffee aroma volatiles are readily adsorbed by the calcium sulfate granules but displaced by adsorbed moisture. Early in the drying process, moisture and aroma volatiles are both adsorbed onto the calcium sulfate granules. As the drying process continues and the number of available adsorption sites decreases, moisture from the aroma gas stream begins to displace bound aroma volatiles into the exiting desiccant-treated aroma gas stream. It is only when at least about 4.3% by weight (dry basis) of the calcium sulfate granules is adsorbed moisture do we get sufficient displacement of the aroma volatiles responsible for eliminating or masking the excessively musty aroma described herein.

Unlike the moisture adsorption capacity of the desiccant bed as described hereinbefore, the minimum adsorbed moisture level remains constant with each regeneration and reuse cycle (see FIG. 1). This suggests that the calcium sulfate granules do not lose their affinity for coffee aroma volatiles although they do lose their affinity for moisture with each new cycle. Accordingly, with each subsequent regeneration and reuse cycle, the acceptable range between minimum and maximum (adsorption capacity) permissible adsorbed moisture levels in the desiccant bed decreases. After about 30 cycles, this range disappears so that the calcium sulfate granules can no longer be regenerated and reused in the drying process. Regeneration and reuse beyond about 30 cycles will result in desiccant-treated coffee aroma gas with an unbalanced and excessively musty aroma.

As described in U.S. patent application Ser. No. 07/902,747, filed Jun. 23, 1992, failure to stop the drying process at or b ore he moisture adsorption capacity of the desiccant bed will result in excessive amounts of moisture breaking through to the desiccant-treated coffee aroma gas. These excessive amounts of moisture can result in the rapid generation of excessive sulfurous aromas.

The desiccant bed of calcium sulfate granules can comprise a vessel, preferably a closed vessel, having an inlet and outlet for entry and exit of a coffee aroma gas stream. The vessel will typically have a length to diameter ratio of from about 10:1 to about 3:1, more typically from about 9:1 to about 7:1. The vessel is packed with calcium sulfate granules.

As a practical matter, at least two desiccant vessels are normally used in a manufacturing operation designed to dry moisture-containing coffee aroma gas. At any given moment, at least one vessel is on-line and drying a stream of coffee aroma gas while the other is off-line and being regenerated.

The calcium sulfate granules can be provided by known and conventional means. Particularly preferred is Drierite, a granulated calcium sulfate desiccant manufactured by W. A. Hammond Drierite Company, Xenia, Ohio. Drierite is well known for its use in drying air and industrial gases in relatively large quantities. Other well-known drying agents include potassium carbonate, magnesium sulfate, calcium oxide, phosphoric oxide, calcium chloride, potassium hydroxide and sodium hydroxide.

The stream of moisture-containing coffee aroma gas can be passed through the desiccant bed in a continuous or intermittent manner. After the moisture-containing coffee aroma gas has been discontinued as described hereinbefore, the desiccant vessel is taken off-line and the hydrated calcium sulfate therein is regenerated (air dried to contain less than about 0.5% moisture by dry weight basis of the calcium sulfate). Calcium sulfate granules are not used beyond about 30 cycles due to the adsorbed moisture criticality described hereinbefore and illustrated in FIG. 1 (moisture adsorption capacity drops to below the minimum permissible adsorbed moisture level).

To initiate regeneration of hydrated calcium sulfate, the desiccant vessel is taken off-line from the moisture-containing aroma gas stream. Typically ambient air is heated to between about 450° and about 600° F. and pumped or blown into the desiccant vessel inlet. The hot air passes through the calcium sulfate granules therein and exits at the vessel outlet. The hot, moisture-laden air from the outlet is exhausted to the atmosphere. The stream of hot air is passed continuously through the vessel until the bed of calcium sulfate granules contains not more than about 0.5% moisture by weight (dry basis) of the granules. It normally takes 3–8 hours to sufficiently dry a vessel of calcium sulfate granules.

About 250–300 BTU's are typically required to regenerate a pound of calcium sulfate granules exclusive of heat loss. Any source of heat may be used that will provide clean air for the operation at the requisite temperature. A desiccant vessel as described herein will normally require about 25 scfm of hot air and about 3 KW's of electric heat per 100 pounds of calcium sulfate granules to regenerate it in four hours.

Moisture levels of the hot air stream can be monitored at the vessel inlet and outlet to indirectly identify the point at which the calcium sulfate is sufficiently regenerated. When the moisture content at the outlet is about equal to that of the inlet, the calcium sulfate is sufficiently regenerated (less than about 0.5% adsorbed moisture by dry weight basis of the calcium sulfate). Temperatures at the inlet and outlet can also be monitored to indirectly measure moisture content. When the outlet temperature is about equal to the inlet temperature, the calcium sulfate is sufficiently regenerated.

When the calcium sulfate granules are regenerated, the heating device warming the inlet air stream is turned off. A dry air stream (dew point temperature less than about $-10°$ F.) is then pumped through the vessel until the outlet air temperature drops below about 100° F., preferably to about 68° F. The vessel can then be placed on-line with the moisture-containing aroma gas stream to resume the desiccation of the aroma gas. Alternatively, the inlet and outlet can be capped and the vessel stored for later use.

It should be noted that other known methods of reducing the moisture content of moisture-containing coffee aroma gases can be used to complement the calcium sulfate gas drying process of the present invention. Examples of such known methods include, but are not limited to, roasting under dry conditions and using low-moisture quenches or quenching mediums during roasting. A particularly preferred method is the use of precondensers prior to the calcium sulfate gas drying process. In such a method, a stream of moisture-containing coffee aroma gas is passed over a precondenser to cool the gas stream to a dew point temperature of between about 35° and about 60° F. About 25–75% of the moisture, typically about 50% of the moisture, in the moisture-containing aroma gas stream can be condensed onto cooled surfaces within the precondenser. As more moisture is removed from the moisture-containing coffee aroma gas, more of the moisture-containing coffee aroma gas by volume can be dried by a given amount of calcium sulfate granules. Likewise, the volume of gas required to reach the minimum (4.3%) permissible adsorbed moisture level in the desiccant bed also increases.

The calcium sulfate gas drying process of the present invention reduces the contact of moisture with coffee aroma volatiles during the optional manufacture, described hereinafter, of aromatized coffee oil. Such contact can result in the rapid development of excessive sulfurous aromas in the aromatized coffee oil. For example, moisture from coffee aroma gas is normally removed from aromatized coffee oil only after combining a moisture-containing coffee aroma gas with a coffee oil to form the aromatized oil. Water is normally removed from the aromatized coffee oil by decanting or centrifuging. Prior to removing the water from the aromatized oil, the water interacts with coffee volatiles to rapidly generate excessive amounts of sulfurous volatiles. This undesirable interaction is avoided by removing the moisture directly from the coffee aroma gas prior to condensing and combining it with a coffee oil.

It is believed that these excessive sulfurous aromas are formed by a reaction within the aromatized coffee oil of ethanal, methanethiol and hydrogen sulfide with water. This results in the generation of 1-methyl-ethanethiol, a compound with a strong sulfurous aroma. This reaction is described, without reference to coffee, by Schulte, Koenders, *Journal Agr. Food Chem.*, Vol. 20, No. 2, pg. 181 (1972).

The desiccant-treated coffee aroma gas made in accordance with the process herein can then be used in any known or conventional manner for aromatizing various substrates. Such substrates include soluble or instant coffee, roast and ground coffee, mixtures thereof, coffee packages, and the like.

Aromatization of Substrates Using Desiccant-Treated Coffee Aroma Gas

In a preferred process of the present invention, the desiccant-treated coffee aroma gas is condensed and combined with a cryofied aroma carrier, equilibrated and then melted. The melted product is an aromatized coffee oil that can then be used to aromatize various substrates. A detailed description of this aromatization process is described below.

1. Aroma Carrier

The aroma carrier for use in the aromatization process herein can be any suitable substrate or sorbent to which coffee aroma volatiles can be transferred such that the substrate or sorbent acts as a carrier for the volatiles.

The source of any aroma carrier utilized to aromatize a substrate will, of course, generally depend upon the product whose aroma is to be enhanced. Coffee oil is the preferred carrier when the aroma to be carried is coffee aroma and the product whose aroma is to be enhanced is coffee. Other types of carriers, however, may also be used to aromatize coffee products. Typical of such other aroma carriers are edible fats and oils, which can be of either animal or vegetable origin and can include common triglycerides such as soybean oil, rapeseed oil, corn oil, marine oils, animal oils, oils extracted from fruits, berries and vegetables.

Coffee oil for use in the optional aromatization process herein can be obtained by utilizing extraction methods well known in the art to recover coffee oil from roasted coffee beans. Generally, two extraction methods are used. The first comprises an extraction process wherein organic solvents and/or super critical carbon dioxide are used to remove coffee oil from roasted and ground coffee. In this process, the organic solvent and/or super-critical carbon dioxide, after contact with the roasted and ground coffee, is removed from the extract to yield a residue of coffee oil.

The second and more common method involves expressing coffee oil from roasted coffee by subjecting the roasted coffee to extreme mechanical pressure. The product of this process is often referred to as expeller coffee oil. Expeller oil is preferred since it does not require the addition of foreign materials, e.g., organic solvents, to coffee substrates to obtain the coffee oil.

Coffee oil for use in this aromatization process should contain less than about 0.1% moisture prior to combining it with the desiccant-treated coffee aroma gas. This low-moisture oil can be obtained by any known or conventional method for removing water from such materials. These methods typically Include flash drying, centrifugation, ultra centrifugation, molecular filtration, contact with drying agents, use of glass wool packed columns, and combinations of such techniques. Other drying operations that do not adulterate or degrade the coffee oil can also be used.

As with other aroma carrier oils, coffee oils fix or retain the coffee aroma volatiles so that they can be retained and later used to aromatize various substrates.

2. Combining and Condensing Desiccant-Treated Aroma Gas with Cryofied Aroma Carrier In the aromatization process, a desiccant-treated coffee aroma gas is prepared as described hereinbefore. The desiccant-treated coffee aroma gas is then condensed and combined with a cryofied aroma carrier. A cryofied aroma carrier such as cryofied coffee oil can be produced in a manner similar to that disclosed by U.S. Pat. No. 3,183,163 (Patel), issued Jan. 1, 1974, or U.S. Pat. No. 4,335,149 to Stipp (assigned to The Procter & Gamble Company) issued Jun. 15, 1982, both of which are herein incorporated by reference.

In making, for example, a cryofied coffee oil, the coffee oil is added to a cryogenic fluid to form a cryogenic slurry. Such a slurry thus contains a mixture of cryogenic fluid and solidified coffee oil particles. The cryogenic fluid is continuously agitated during the addition of the coffee oil. Such addition typically takes about 10-15 minutes depending on the relative amounts of coffee oil and cryogenic fluid. The slurry contains less than about 0.1% water.

Acceptable cryogenic fluids for use in this optional aromatization process are those having a boiling point (at atmospheric pressure) less than $-109°$ F. These include liquid nitrogen, liquid hydrogen, liquid helium, liquid air, and mixtures thereof. Liquid nitrogen is highly preferred since it is easily obtained and is also substantially inert. The other liquid gases are typically more volatile and consequently may present a safety concern. The weight ratio of cryogenic fluid to coffee oil is typically greater than about 1:1, more typically between about 5:1 to about 2:1.

Since liquid nitrogen is the preferred cryogenic fluid for use herein, the aromatization process is described hereinafter as employing liquid nitrogen. It shall be understood, however, that other cryogenic fluids described above can also be used.

After the cryofied slurry (liquid nitrogen and cryofied coffee oil particles) is formed, the slurry temperature is allowed to increase above the boiling point of the liquid nitrogen ($-320°$ F.). This results in evaporation of the liquid nitrogen from the slurry. Complete evaporation typically occurs over 10-30 minutes. Evaporation times can be accelerated by using continuous or intermittent agitation of the slurry. After evaporation, a mass of cryofied coffee oil particles, substantially free of liquid nitrogen, remains.

The cryofied coffee oil is then combined with the desiccant-treated coffee aroma gas, preferably by one of two methods. In a less preferred method, the desiccant-treated aroma gas is condensed into dry aroma frost and added to the cryofied coffee oil particles. This is accomplished by passing the desiccant-treated coffee aroma gas over a cooled surface having a temperature sufficient to condense the desiccant-treated aroma gas onto the cooled surface. Preferably, the temperature of the surface will be below about $-150°$ F., most preferably below about $-210°$ F. More of the aroma gas will condense (about 90%) when the surface temperature is below $-210°$ F. A suitable condenser may comprise a jacketed, vertically-mounted, scraped-wall heat exchanger cooled by a liquid gas refrigerant such as liquid nitrogen. Other similar condensers can also be used. The aroma frost so formed can then be added directly to the cryofied coffee oil particles.

Rather than adding a precondensed aroma frost to the cryofied oil particles as described hereinbefore, the desiccant-treated aroma gas is more preferably condensed directly onto the cryofied coffee oil particles. This results in the formation of a mass of cryofied aroma/coffee oil particles wherein the particles have an inner solidified coffee oil core and an outer layer of condensed aroma gas, e.g., solidified carbon dioxide, coffee aroma materials, and less than 0.1% moisture.

In the aromatization process herein, the desiccant-treated aroma gas is introduced into a cooled container of the cryofied coffee oil particles (substantially free of liquid nitrogen). The cryofied coffee oil particles in this container can be maintained at a temperature of from about $-210°$ to about $-290°$ F. Temperatures below about $-290°$ F. can be used but oxygen may then condense on the particles. Oxygen condensates can represent a safety risk during manufacturing and are preferably avoided. Temperatures above about $-210°$ F. can also be used, but the condensing fraction of aroma gas is thereby undesirably reduced to less than 90%.

As the desiccant-treated aroma gas enters the cooled container, it condenses onto the cryofied coffee oil particles. Some condensation may also occur onto the walls of the cooled container but preferably most of the condensation occurs directly onto the cryofied coffee oil particles. The container preferably contains a means for agitating the cryofied oil particles as the aroma gas enters the container. By agitating the particles during condensation, the coffee aroma volatiles more uniformly condense onto the particles within the particle mass. The cooled container can be an open or vented container with a means for cooling the contents therein to less than about $-210°$ F. The cooling means typically is provided by, but is not limited to, a jacket of liquid nitrogen associated with the walls of the cooled container.

3. Controlled Equilibration

The cryofied mass of aroma oil particles is then subjected to controlled temperature equilibration which allows substantially all of the solid carbon dioxide to sublime from the coffee oil particles. Equilibration also allows the coffee aroma volatiles to migrate into or to affix thereafter within the coffee oil while the carbon dioxide sublimes and is removed from the cryofied particles.

During equilibration, the mass of cryofied aroma/coffee oil particles can be maintained in a vented vessel, the vessel being bathed in a surrounding medium having a temperature of between about $-109°$ and about 100° F., preferably from about $-50°$ to about 70° F., most preferably at about room temperature (68° F.). The vented vessel can be kept in an area or room maintained at these temperatures or, more preferably, the vented vessel can be surrounded by a circulating jacket of gas, the gas having the temperatures just recited. At these surrounding temperatures, the solid carbon dioxide within the cryofied mass sublimes and can be removed from the vented vessel, the sublimation temperature of solid carbon dioxide being about $-109°$ F. Intra-vessel pressures above or below atmospheric pressure can be used but are not necessary for the practice of the present invention. Typically, atmospheric pressure is maintained within the vented vessel in which the cryofied mass is equilibrated.

Controlled temperature equilibration of the cryofied mass of carbon dioxide-containing aroma/coffee oil particles is an important aspect of the aromatization process herein. When equilibration begins, the cryofied mass will typically have a temperature below about −210° F. The temperature then initially rises as the particle mass is warmed and eventually plateaus at −109° F. At −109° F., the solid carbon dioxide begins to sublime. When substantially all of the carbon dioxide has sublimed, the temperature of the particle mass begins to increase above −109° F. At that point, the equilibration is complete. The cryofied mass then contains cryofied coffee oil fixed with coffee aroma volatiles with less than about 0.1% water and substantially no solid carbon dioxide. To assure a complete equilibration (e.g. substantially all solid carbon dioxide sublimed), equilibration is preferably allowed to proceed until the particle mass temperature is about −105° F. Allowing the temperature to rise above about −105° F. can result in unnecessary loss of coffee aroma volatiles.

Preferably, the cryofied mass of aroma/coffee oil particles during equilibration is agitated in an intermittent or continuous manner, preferably in a continuous manner. Agitating reduces equilibration times and the temperatures needed to bathe the vented vessel during equilibration. In a typical example within the optional aromatization process, the equilibration requires from about 3 to about 7 hours using continuous agitation in a vented vessel exposed to room temperature air. Without agitation, equilibration could take as long as 15–30 days.

Typically, not more than about a 5% of the coffee volatiles are lost during the controlled equilibration. Substantially all of the cryofied carbon dioxide can be driven off in about 3-7 hours while at least about 95% of the coffee volatiles are retained.

4. Melting Step

In the final step in the optional aromatization process, the cryofied mass of aroma oil particles, rendered substantially free of moisture during the calcium sulfate drying step and substantially free of carbon dioxide during the controlled temperature equilibration step, is melted to form the an aromatized coffee aroma oil (less than 0.1% moisture). Melting, which is preferably carried out relatively quickly and in an enclosed space, is achieved by subjecting the equilibrated cryofied mass of aroma oil particles to temperatures of from about 60° to about 110° F., preferably from about 80° to about 100° F., for a period of time sufficient to melt the particles.

The melting step is preferably carried out using a high surface-area heater/melter. The temperature of the heater surfaces (warming surfaces) are maintained at between about 60° and about 110° F., preferably from about 80° to about 100° F. The melting period can vary but melting typically occurs over a time period of about 1-3 hours. Melting times can extend beyond the 1-3 hour range depending on the size of the equilibrated mass to be melted and the heating parameters selected (i.e. amount of heat, amount of surface area per volume of equilibrated mass). The melted aromatized coffee oil can then be used to aromatize other substrates, e.g., instant coffee.

By removing substantially all of the solid carbon dioxide from the cryofied mass of aroma/coffee oil particles in the controlled temperature equilibration step, less energy is subsequently needed to melt the cryofied mass in the melter/heater. Since less energy is needed, the composition can be melted over a shorter period of time. Also, the lower energy melting made possible by the process herein reduces the degradation of the coffee aroma materials in the aroma/coffee oil composition.

EXAMPLES

The calcium sulfate drying process of the present invention is illustrated by the following examples.

EXAMPLE 1

About 162,000 lb. of roasted coffee beans are held at about room temperature for 7 hours (post-roasting) before grinding. The beans are ground which produces a stream of coffee grinder gas mixed with air (about 35,000 scf). Moisture content of the air/grinder gas mixture is about 2%. As the grinder gas is generated, it forms a gaseous stream which is continuously captured in an overhead hood and pumped through a water-cooled precondenser. The stream of grinder gas exiting the precondenser has a d.p.(dew point) temperature of about 45° F. and a moisture content of 0.6%. The stream of grinder gas is then pumped through a desiccant vessel (8:1 length to diameter ratio filled with 375 lb. of 10 mm Drierite) at 50 scfm. The Drierite initially contains less than 0.1% moisture (dry weight basis) and is on its tenth regeneration and reuse cycle. After passing through the desiccant vessel, the grinder gas stream exits the vessel and is captured. All of the exiting gas is collected and combined until the adsorbed moisture in the desiccant column reaches about 4.8% [0.082 lb./cu ft × 35,000 scf × 0.00633 (saturation humidity at 45° F.) × 100/375 lb. Drierite] by weight (dry basis) of the Drierite granules, at which point the drying process is stopped and the hydrated desiccant column is taken off-line. $M_p$ is approximately zero (less than 0.1% adsorbed moisture). The desiccant-treated coffee grinder gas collectively contains about 20 ppm of moisture.

EXAMPLE 2

About 150 lb. of coffee expeller oil (less than 0.1% moisture) is poured into and continuously mixed with (over 15 minutes) 300 pounds of liquid nitrogen contained within a cryofication tank. The resulting slurry is washed with liquid nitrogen into a cryomixer. The cryomixer comprises a vented vessel jacketed in liquid nitrogen and equipped for agitating the vessel contents.

The slurry is continuously agitated for 10–15 minutes in the cryomixer until all of the liquid nitrogen evaporates, leaving a particle mass comprising cryofied coffee oil particles. While continuously agitating the particle mass (cryofied coffee oil particles) and maintaining a particle mass temperature of about −250° F., a stream of the desiccant-treated grinder gas from Example 1 is then vented into the cryomixer. When all 35,000 scf of the grinder gas has been vented into and condensed within the vessel (approximately 12 hours), the liquid nitrogen is removed from the surrounding jacket.

Nitrogen gas is circulated through the jacket surrounding the cryomixer. The circulating gas initially enters the jacket having a temperature of about 68° F. The temperature of the cryofied mass increases from about −250° F. to a plateau of −109° F. as carbon dioxide is vented from the cryomixer. When the temperature of the cryofied mass reaches −105° F., the resulting equilibrated carbon dioxide-free cryofied mass (150 lb.) is immediately placed in a high-surface area melter. The heating surfaces within the melter are kept at about 90° F. As the equilibrated mass liquefies, it is collected in a closed container. The resulting aromatized coffee oil contains less than 0.1% moisture.

EXAMPLE 3

This example illustrates the effect that adsorbed moisture parameters have on coffee aroma gas.

Examples 1 and 2 are repeated numerous times, each time varying the adsorbed moisture level in the desiccant bed at which the drying process is discontinued. Aromatized coffee oil from each repetition is injected into a 30 ml glass jar filled with dry instant coffee. The volume of injected oil is varied between about 30–80 $\mu$l to provide a similar head space aroma intensity for each jar of aromatized instant coffee. Each jar is sealed and allowed to equilibrate for about 1–3 days. The jar is then opened and the aroma evaluated for balance and excessive musty aromas by expert sensory panels. The results of this evaluation are set forth below.

| Drying operations (No.) | Adsorbed moisture levels | Oil batches exhibiting musty aroma (No.) |
|---|---|---|
| 46 | 3%–4.2% | 34/46 |
| 11 | 4.3%–4.5% | 1/11 |
| 24 | 4.6% - but less than moisture breakthrough point | 0/24 |

It can be seen from these results that the development of excessive musty aromas can be largely avoided by running the calcium sulfate gas drying operation to at least about a 4.3% adsorbed moisture level by weight (dry basis) of the calcium sulfate granules within the desiccant bed. The reduced number of oil batches exhibiting musty aromas at or above a 4.3% adsorbed moisture level is statistically significant by t-testing at 95% confidence level.

What is claimed is:

1. A process for making dry coffee aroma gas with improved aroma characteristics, which process comprises the steps of:
    (a) passing a stream of moisture-containing coffee aroma gas through a desiccant bed of calcium sulfate granules, wherein said granules initially contain less than about 0.5% adsorbed moisture by dry weight of said granules;
    (b) discontinuing the stream of moisture-containing coffee aroma gas after the adsorbed moisture content of the calcium sulfate granules increases from less than about 0.5% to at least about 4.3% by dry weight of said granules, but before the moisture content of the stream of desiccant-treated coffee aroma gas exiting the desiccant bed exceeds about 1000 ppm; and
    (c) collecting and combining all of the desiccant-treated coffee aroma gas from step (a) which exits the desiccant bed until the stream of moisture-containing coffee aroma gas is discontinued in step (b); wherein the collected and combined desiccant-treated coffee aroma gas contains between about 10 and about 200 ppm of moisture and does not exhibit an unbalanced and excessively musty aroma.

2. A process according to claim 1 wherein the desiccant bed of calcium sulfate granules has been regenerate from 0 to about 30 times.

3. A process according to claim 2 wherein the stream of moisture-containing coffee aroma gas is discontinued when the moisture content of the stream of desiccant-treated coffee aroma gas exiting the desiccant bed is between about 200 and about 1000 ppm.

4. A process according to claim 2 wherein the moisture-containing coffee aroma gas is coffee grinder gas.

5. A process for making dry aromatized coffee oil with improved aroma characteristics, which process comprises the steps of:
    a) passing a stream of moisture-containing coffee aroma gas through a desiccant bed of calcium sulfate granules, wherein said granules initially contain less than about 0.5% adsorbed moisture by dry weight of said granules;
    b) discontinuing the stream of moisture-containing coffee aroma gas after the adsorbed moisture content of the calcium sulfate granules increases from less than about 0.5% to at least about 4.3% by dry weight of said granules, but before the moisture content of the stream of desiccant-treated coffee aroma gas exiting the desiccant bed exceeds about 1000 ppm; and
    c) condensing and combining all of the desiccant-treated coffee aroma gas exiting the desiccant bed with cryofied particles of an aroma carrier oil to form a cryofied particle mass containing not more than about 0.1% by weight of moisture and comprising condensed, carbon dioxide-containing, desiccant-treated, coffee aroma gas and cryofied aroma carrier oil, the cryofied particle mass being maintained at a temperature sufficiently low to maintain the carbon dioxide-containing, desiccant-treated, coffee aroma gas in condensed form; then
    d) equilibrating the cryofied particle mass of step (c) by subjecting said cryofied particle mass to a surrounding temperature of between about −109° and about 100° F. until the temperature within the particle mass increases to between about −109° and about −105° F., to thereby remove substantially all of the carbon dioxide from said cryofied particle mass; and then
    e) melting the resulting carbon dioxide-free, cryofied particle mass of step (d) by subjecting said particle mass to a temperature of between about 60° and about 110° F. for a period of time sufficient to liquefy said particle mass;
wherein the liquefied particle mass is an aromatized coffee oil containing less than about 0.1% moisture and exhibits no excessively musty aromas.

6. A process according to claim 5 where the desiccant bed of calcium sulfate granules has been regenerated from 0 to about 30 times.

7. A process according to claim 6 wherein the moisture-containing coffee aroma gas is discontinued when the moisture content of the stream of desiccant-treated coffee aroma gas exiting the desiccant bed is between about 200 and about 1000 ppm.

8. A process according to claim 6 wherein the moisture-containing coffee aroma gas is a coffee grinder gas.

9. A process according to claim 8 wherein the aroma carrier oil is coffee oil.

10. A process according to claim 5 wherein the cryofied particles are subjected to agitation during the condensation of step 4(c) and the equilibration of step 4(d).

11. A process according to claim 5 wherein the cryofied particle mass is maintained at a temperature of between about −210° and about −290° F. during step 4(c).

12. A process according to claim 4 wherein the temperature surrounding the cryofied particle mass in step 4(e) is maintained at between about −50° and about 70° F.

* * * * *